US008217315B2

(12) United States Patent
Suetsugu

(10) Patent No.: US 8,217,315 B2
(45) Date of Patent: Jul. 10, 2012

(54) PULL-OUT HEAT COOKING DEVICE

(75) Inventor: Yumiko Suetsugu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 591 days.

(21) Appl. No.: 12/027,851

(22) Filed: Feb. 7, 2008

(65) Prior Publication Data

US 2009/0200901 A1 Aug. 13, 2009

(51) Int. Cl.
*A21B 1/00* (2006.01)
*A47B 77/08* (2006.01)

(52) U.S. Cl. .......... 219/403; 219/401; 312/236; 99/451; 99/468

(58) Field of Classification Search .................. 219/403, 219/401; 312/236; 99/451, 468
See application file for complete search history.

(56) References Cited

U.S. PATENT DOCUMENTS

| | | | | |
|---|---|---|---|---|
| 5,525,782 A * | 6/1996 | Yoneno et al. | ................ | 219/682 |
| 6,018,158 A * | 1/2000 | Kang | ............................ | 219/757 |

FOREIGN PATENT DOCUMENTS

| | | | |
|---|---|---|---|
| GB | 2076530 A | | 12/1981 |
| JP | 56-173907 U | | 12/1981 |
| JP | 62-154306 | * | 9/1987 |
| JP | 62-154306 U | | 9/1987 |
| JP | 3-45820 A | | 2/1991 |
| JP | 11-83037 A | | 3/1999 |
| JP | 11-237053 A | | 8/1999 |

* cited by examiner

*Primary Examiner* — Shawnta Fuqua
(74) *Attorney, Agent, or Firm* — Birch, Stewart, Kolasch & Birch, LLP

(57) ABSTRACT

A packing is arranged in a manner blocking a gap between with a handle in an edge of an opening of a cooking device body. In a close state of the door, steam generated from an object to be heated in a heating chamber at the time of cooking the object to be heated is prevented by the packing from flowing between an edge and the handle. Hence, it is possible to prevent dews from arising on the handle due to dewing. The packing is equipped with a fixing part installed in a deep end edge of the opening, and a sealing part extending downward from the fixing part and being contactable with a back part of the handle.

12 Claims, 5 Drawing Sheets

PULL-OUT HEAT COOKING DEVICE

The present application is based on Japanese patent application No. 2006-186234 filed on Jul. 6, 2006, the entire contents of which are hereby incorporated by reference.

BACKGROUND OF THE INVENTION

In the field of microwave oven, new distinct configuration of automatic drawer type is emerging of late, for which this invention is intended for a further improvement.

Traditional microwave ovens are frequently installed on counter-top, where cooking exhaust of mostly steam vapor is usually continuously ventilated from behind the oven by a fan system.

Drawer type microwave ovens are installed built-in as enclosed inside the kitchen counter below the waist level; ventilation with a fan system is limited in quantity.

To name an example of the outcome of the above, vapor is more likely to leak from the gap between the door and the cooking chamber, especially near the top part; dew deposit there can be annoying to the customer. This invention is intended to minimize the annoyance in this respect.

FIELD OF THE INVENTION

This invention relates to a drawer type cooking device which is provided with a drawer body drawn out and accommodated from and into a cooking device body, and an door to block an opening of a heating chamber in an accommodation state of the drawer body.

DESCRIPTION OF THE RELATED ART

Heretofore, a drawer type cooking device which enables a drawer body, on which an object to be heated can be placed, to be drawn out with an door from a cooking device body, and enables an opening of a heating chamber to be closed with the door in a state of accommodating the drawer body in the heating chamber in the cooking device body is proposed (Japanese Patent Laid-Open Publication No. 3-45820 (Patent Document 1) (from page 2, lower left column, 6th line to page 3, upper right column, 16th line, FIG. 1 to FIG. 5), and Japanese Patent Laid-Open Publication No. 11-237053 (Patent Document 2) (paragraphs [00291] to [0032], FIG. 1)). This kind of drawer type cooking device is equipped with an apparatus body (cooking device body) which has a galley (heating chamber) which accommodates an object to be heated, an door which shuts the galley from open air, and a bottom plate interlocking with this door or a heating container (drawer body) which can place a cooked material. In further detail, the bottom plate or heating container is smoothly slid by a sliding mechanism, and the bottom plate or heating container can be moved in a drawn-out or accommodated direction to the apparatus body by a rotational output of a motor being transferred to the sliding mechanism through transfer means, such as a rack and pinion mechanism. In a state that the bottom plate or heating container is accommodated in the apparatus body, the door shuts the galley from open air. A cooking device described in Patent Document 2 forms a heating chamber, which confines a microwave, by forming an opening in an upper portion and covering the opening of a heating container drawable from the cooking device body, and prevents leakage of a radio wave by providing a choke groove between a peripheral part of the opening and a lid part of the heating container.

In this type of drawer type cooking device, steam is generated from an object to be heated at the time of cooking the object to be heated, such as food, by heating. The generated steam rides on an air flow in the heating chamber to flow near the handle of the door, and is cooled at that time for dewing to arise on the handle. Such dewing lowers appearance quality after cooking by heating, and wet an arm or a sleeve of a user touching the handle at the time of taking out the object to be heated. When discharge of steam is concentrated on an exhaust vent provided in a position different from the vicinity of the handle, remarkable dewing is seen in the portion.

Then, in a drawer type cooking device, there is a problem to be solved at a point of preventing effectively, in a state of closing the door, steam, generated from an object to be heated in a heating chamber, from flowing into a gap, which is hard to completely close, between a handle, which is provided in an upper edge of an door, and an opening edge of a cooking device body.

SUMMARY OF THE INVENTION

The present invention aims at providing a drawer type cooking device which can prevent that steam is dewed on a handle by preventing that the steam generated from an object to be heated in a heating chamber flows between an upper end of an door, and an opening edge of a cooking device body.

In order to solve the above-mentioned problem, a drawer type cooking device according to this invention is a drawer type cooking device which enables a drawer body, on which an object to be heated can be placed, to be drawn out with an door from a cooking device body, and enables an opening of a heating chamber to be closed with the door in a state of accommodating the drawer body in the heating chamber in the cooking device body, wherein a handle for open and close operations is provided in an upper portion of the door, wherein a packing is arranged in an edge of the opening of the cooking device body in a manner blocking a gap between with the handle in a close state of the door, and wherein an exhaust vent which leads in the heating chamber is formed in a lower portion of the door.

In the drawer type cooking device according to this invention, although complete closure is hard between the handle for open and close operations, which is provided in the upper portion of the door, and the opening of the cooking device body in a state that the door is closed and it is hard to avoid generating a gap although it is small, a packing is arranged in a manner that this gap in the edge of the opening of the cooking device body is blocked. Hence, in a state of closing the door, the packing seals the gap lest steam, generated when cooking an object to be heated in a heating chamber, should flow into this gap. Hence, it is possible to prevent dews from arising on the handle due to dewing. In addition, since the packing is arranged in an opening side, even if the door is opened and closed, a usually flat top face of the handle appears in a front side. The packing never appears in the front side with the door.

In this drawer type cooking device, the handle can be equipped with a handle body installed in an upper portion of a body of the door, and a finger-engaging part which extends in a front side of the door from the handle body concerned, and over which finger hooking is possible for open and close operations. The handle body is installed in an upper portion of an door body to define an upper edge surface of the door. It is possible to draw a drawer body with hooking fingers over the finger-engaging portion extended in a front side of the door from the handle body. In addition, since the handle is seen from the above, it is possible to take in a component of a decorative sheet, a new decorative sheet can be replaced according to a user's preference and the like, in the door.

In this drawer type cooking device, the packing can be equipped with a fixing part installed in a deep end edge of the opening, and a sealing part extending downward from the fixing part and being contactable with the handle. As for the packing, since a fixing part is installed in a deep end edge out of an edge of the opening, it is easy to mount and remove the packing from a back side of the opening, and hence, working efficiency at the time of assembly or maintenance is good. Furthermore, since the fixing part of the packing cannot be seen from the front side of the cooking device, simple appearance can be maintained. In a state of closing the door, since the sealing part extended downward from the fixing part abuts on the handle provided in the door, steam never flows out outward through between an opening edge and the handle.

In the drawer type cooking device where a packing is equipped with a fixing part and a sealing part, it is preferable to deform the above-mentioned sealing part by an upper edge back part of the above-mentioned handle pushed in order to make the above-mentioned door close to make it elastically contact with the upper edge hack part concerned when pushing the door in and making the opening close, a sealing part of the packing is made to be deformed by the upper edge back part of the handle in a final stage of its closeout phase. Since the sealing part is made to be abutted on the handle by an elastic force caused by return of deformation, it is possible to strongly seal a gap between with the handle.

In this drawer type cooking device, it is possible to prevent invasion of a foreign material or a noxious insect with evacuating the above-mentioned exhaust vent by making the above-mentioned exhaust vent as punching holes with a smaller diameter where an aperture rate is high.

As described above, in the drawer type cooking device according to this invention, the handle for open and close operations is provided in an upper portion of the door, the packing is arranged in an edge of the opening of the cooking device body in a manner blocking a gap between with the handle in a close state of the door, and an exhaust vent which leads in the heating chamber is formed in a lower portion of the door. Hence, in the heating chamber, the packing prevents that steam generated from the object to be heated flows through between a top end of the door and an opening edge of the cooking device body to prevent that the steam dews on the handle, and in consequence, it is possible to prevent that an upper portion of the handle gets wet with dews. In addition, since the packing is mounted in an opening side, while mounting and removal are easy in the case of assembly or maintenance, the packing is not seen from the outside also when the door is opened in a normal use state, and hence, it is possible to keep simplicity and cleanliness of the door.

DETAILED DESCRIPTION OF THE PREFERRED EMBODIMENTS

Hereafter, on the basis of attached drawings, an embodiment of a drawer type cooking device according to this invention will be described.

Figure 1:
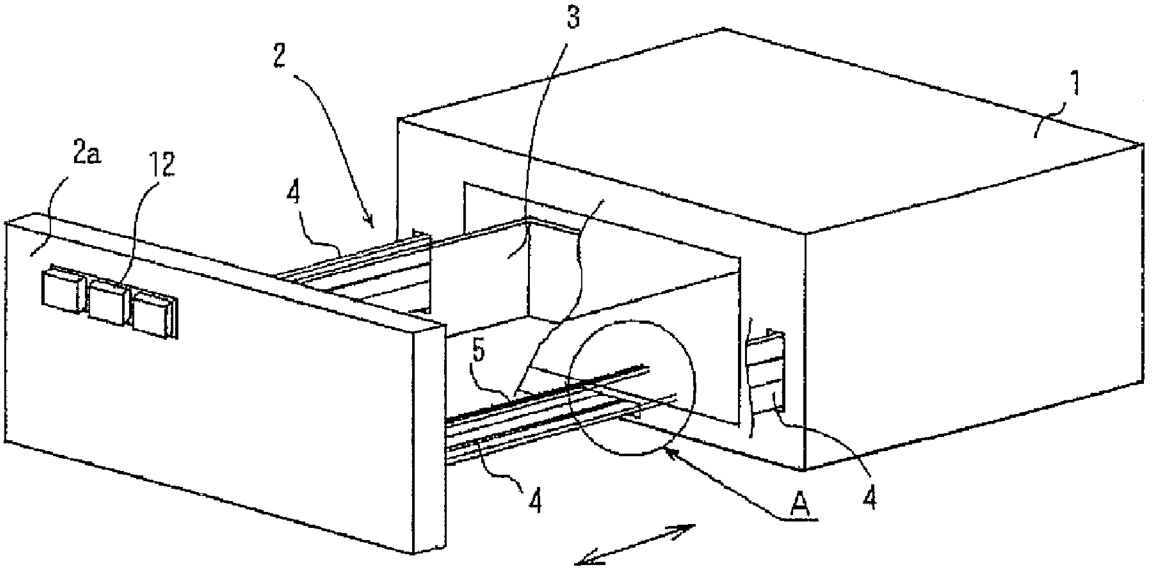
FIG. 1 is a perspective view showing an outline of a drawer type cooking device.

As shown in FIG. 1, the drawer type cooking device (hereafter, this is just abbreviated as a "cooking device") is equipped with a cooking device body 1 and a drawer body 2 which can be drawn out from the cooking device body 1. A heating chamber into which the drawer body 2 for placing an object to be heated cooked can advance is formed inside the cooking device body 1. As for the heating chamber, although its interior is surrounded with respective walls of right and left, upper and lower, and back walls, its front face is formed in the opening for pulling in and out of the drawer body 2.

The drawer body 2 is movably arranged in the cooking device body 1 by a sliding mechanism 4, mentioned later, so as to be able to draw outward from the interior of the heating chamber of the cooking device body 1 in a direction shown by an arrow, or to close from the outside on the contrary. The drawer body 2 is equipped with an door (hereafter, this is abbreviated as a "door") 2*a* for opening and closing the heating chamber, and a heating container 3 on which the door 2*a* is fixed, and which accommodates an object to be heated in a placed condition. The heating container 3 has a front plate attached to the door 2*a*, side plates in right and left sides which extend backward from the right and left of the front plate, a back plate connected in a back face (back) side to the side plates, and a bottom plate connected to the side plates and back plate, and a container opening from which an object to be heated can be taken in and out is formed in an upper portion. In an interior of the cooking device body 1, a microwave generator not shown is arranged, the microwave generator which is constructed of a magnetron which generates a microwave around the heating chamber, and a wave guide which propagates the microwave generated in the magnetron. The microwave generated in the magnetron propagates the wave guide, and is supplied into the heating chamber from a feed opening.

The cooking device is equipped with sliding mechanisms 4, 4, and 4 arranged in right and left, and bottom sides of the heating container 3 in order to move the drawer body 2 inside the cooking device body 1. Although detail is not shown, each sliding mechanism 4 is a nesting type mechanism which consists of a slide rail that a movable rail is made slidable to a fixed rail. The drawer body 2 is movable between a fully open position that the heating container 3 is fully drawn out from the heating chamber, and a fully close position that the heating container 3 is fully contained in the heating chamber. Since the door 2*a* closes the opening 10 of the heating chamber when the drawer body 2 occupies a fully close position, an internal space of the heating chamber is sealed by an inside wall surface of the cooking device body 1 and the drawer body 2. Each sliding mechanism 4 is provided in a passage box formed in the cooking device body 1 in the right and left, and bottom sides of the heating chamber, the fixed rail is fixed to outside the heating chamber in the passage box, and the movable rail can appear frequently in the passage box with the drawer body 2. The drawer body 2 is supported by the cooking device body 1 through the each sliding mechanism 4, and is drawn out from the heating chamber in a stabilized manner. Although a rack 5 is fixed to the movable rail along a longitudinal direction in the sliding mechanism 4 in a bottom side so as to drive the drawer body 2 in an open and close direction, detail of these will be described later.

Regarding the sliding mechanisms 4 and 4 in both of right and left outsides, a mechanism which operates a full close detection switch when moving the drawer body 2 to the fully close position is provided in at least one sliding mechanism 4. In addition, an ahead position detection switch (intermediate switch) is installed in the cooking device body 1 in the middle of the passage box (a position a little near to the full close detection switch). Furthermore, when the drawer body 2 is pushed into an accommodation position from an open state, an actuating lever provided in a deepest position of the movable rail turns on the full close detection switch. In this way, each detection switch is arranged according to each position of full open, intermediate, and full close positions of the drawer body 2 for each position of the drawer body 2 to be known by an operation of each detection switch, which is used for open/close control of the drawer body 2.

When drawing out the drawer body 2, the actuating lever leaves from the full close detection switch, and turns off the full close detection switch. Hence, even if it is not only after cooking by heating but also during cooking by heating, when the drawer body 2 is opened, electric power supply to the microwave generator becomes in an OFF state to disable microwave generation. It is possible to use the full close detection switch as a part of switches which control microwave oscillation and stop. About how the cooking device is actually heat-operated, a user can operate and set other operation switches which are not shown. In addition, a main switch of starting cooking by heating is separately provided so that a user may operate it intentionally. In addition, in the door 2*a*, it is possible to arrange an operation switch 12 for an actuation operation of a switching mechanism, later mentioned, in its front face as an example.

In this way, the drawer type cooking device enables the drawer body 2, on which an object to be heated can be placed, to be drawn out with the door 2*a* from the cooking device body 1, and enables the opening 10 of the heating chamber to be closed with the door 2*a* in a state of accommodating the drawer body 2 in the heating chamber in the cooking device body 1.

Figure 2:
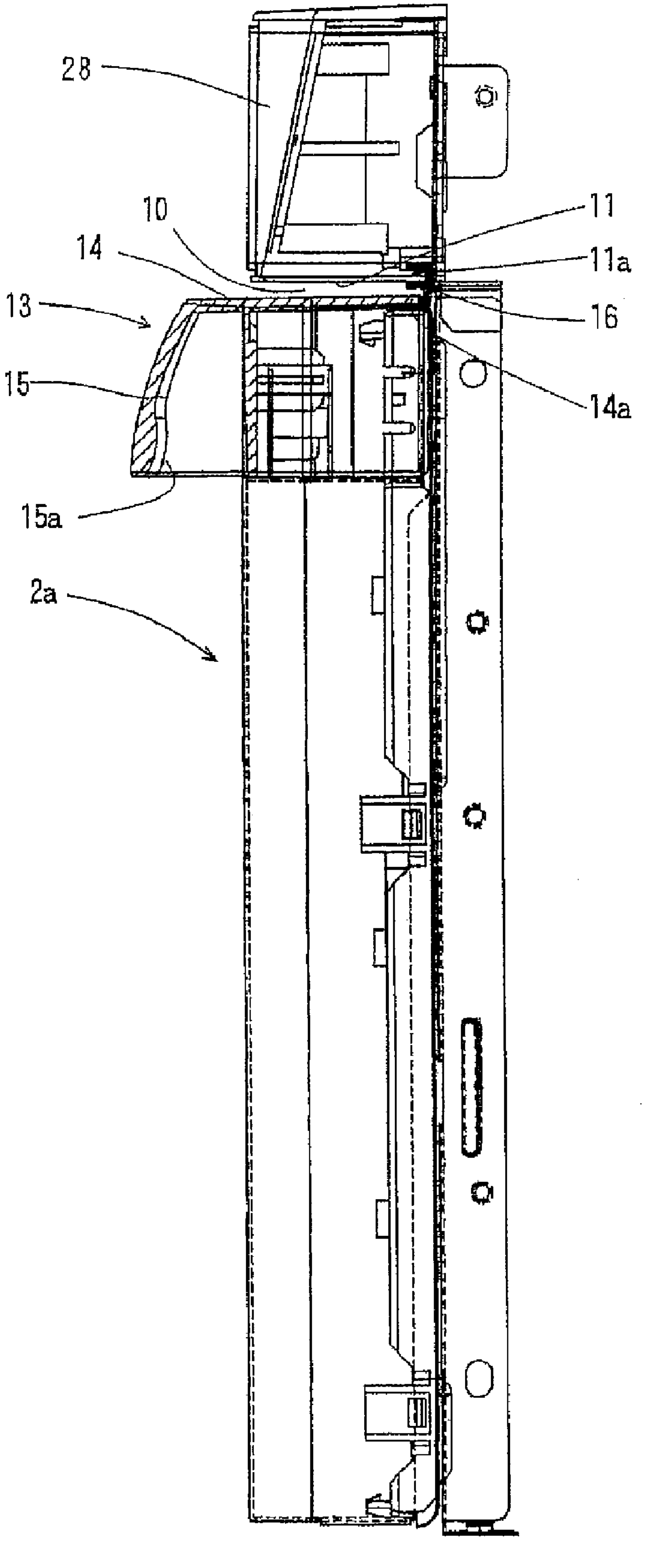
FIG. 2 is a vertical sectional view showing an door of the drawer type cooking device shown in FIG. 1.
Figure 3:
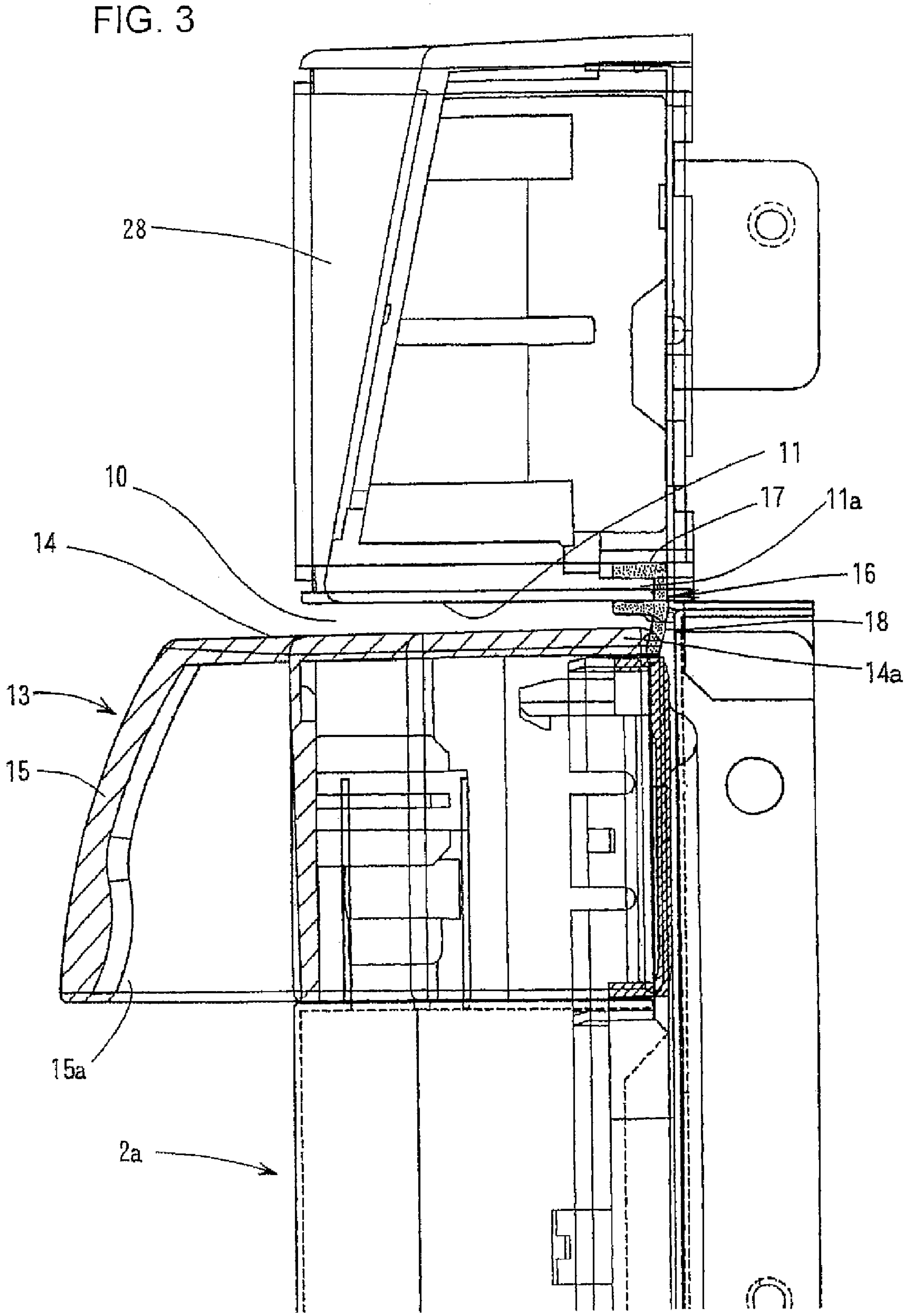
FIG. 3 is an enlarged sectional view showing a principal part of the door of the drawer type cooking device shown in FIG. 2.

As shown in FIGS. 2 and 3, a handle 13 for open and close operations is provided in an upper portion of the door 2*a* of the drawer type cooking device. The handle 13 is equipped with a handle body 14 installed in an upper portion of a body of the door 2*a*, and a finger-engaging portion 15 which extends in a front side of the door 2*a* from the handle body 14 integrally, and over which finger hooking is possible for open and close operations. An upper edge surface 14*a* of the handle body 14 is installed in an upper portion of the body of the door 2*a* to define the upper edge surface of the door 2*a*. The finger-engaging portion 15 is extended in a front side of the door 2*a* from the handle body 14, and becomes an opening 15*a* whose lower part opens. A user can draw the drawer body 2 to the cooking device body 1 by putting fingers from the opening 15*a* and hanging them over the finger-engaging portion 15. In addition, by pushing the finger-engaging portion 15 and door 2*a* from the outside, it is possible to push the drawer body 2 with the door 2*a* into the cooking device body 1. Since the handle 13 is a component seen from above, it is possible to take in a component of a decorative sheet which can be replaced according to a user's preference and the like by making the handle 13 removable from the body of the door 2*a* detachably with a proper fixing tool.

A packing 16 is arranged in a manner blocking a gap between with a handle 13 in a close state of the door 2*a* in an edge 11 of the opening 10 of the cooking device body 1. The packing 16 is equipped with a fixing part 17 installed in a deep end edge 11*a* of the edge 11 of the opening 10, and a sealing part 18 extending downward from the fixing part 17 and being contactable with the handle 13. Since the fixing part 17 of the packing 16 is installed in the deep end edge 11*a* out of the edge 11 of the opening 10, it is easy to mount and remove the packing 16 from a back side of the opening 10 at the time of assembling the drawer body 2, and hence, working efficiency at the time of assembly or maintenance is good. Furthermore, since the fixing part 17 of the packing 16 cannot be seen from the front side of the cooking device, simple and clean appearance can be maintained.

Figure 4:
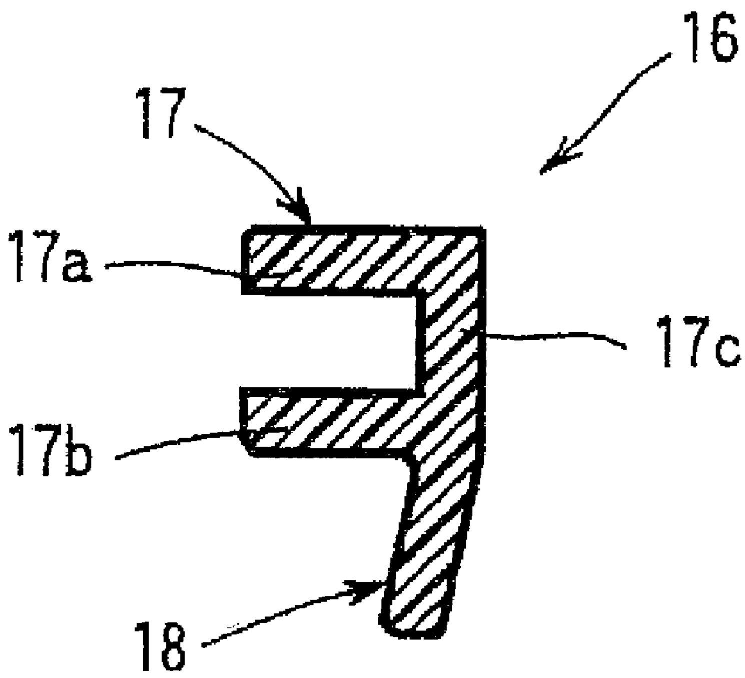
FIG. 4 is a sectional view of a packing used for the drawer type cooking device shown in FIG. 2 or 3.

A sectional shape of the packing used for this drawer type cooking device is shown in FIG. 4. The sectional shape of the packing 16 has a shape of a letter "F". The fixing part 17 has a shape that a joint portion 17*c* connects two parallel side portions 17*a* and 17*b*, and has structure of the two parallel side portions 17*a* and 17*b* sandwiching the deep end edge 11*a* of the opening 10 from upper and lower sides. The sealing part 18 which extends downward from the fixing part 17 and is contactable with the handle 13 extends downward in a manner inclining slightly slantly forward from a lower edge of the joint portion 17*c*.

When pushing the door 2*a* into the cooking device body 1, the deep end 14*a* of the handle body 14 abuts on the sealing part 18 from the slantly forward side. In the fully close state of the door 2*a*, the sealing part 18 may be deformed so as to be suspended straightly. In this case, when pushing in the door 2*a* to make the opening 10 close, the sealing part 18 of the packing 16 abuts on the upper deep end 14*a* of the handle 13 just before completion of a closing step, and the sealing part 18 deforms with abutting on the upper deep end 14*a* by pushing to a subsequent completion. By virtue of an elastic action in a returning direction resulting from the deformation, the sealing part 18 abuts on the deep end 14*a* of the handle body 14 with an elastic force, and seals the handle body 14 by a strong sealing force.

Figure 5:
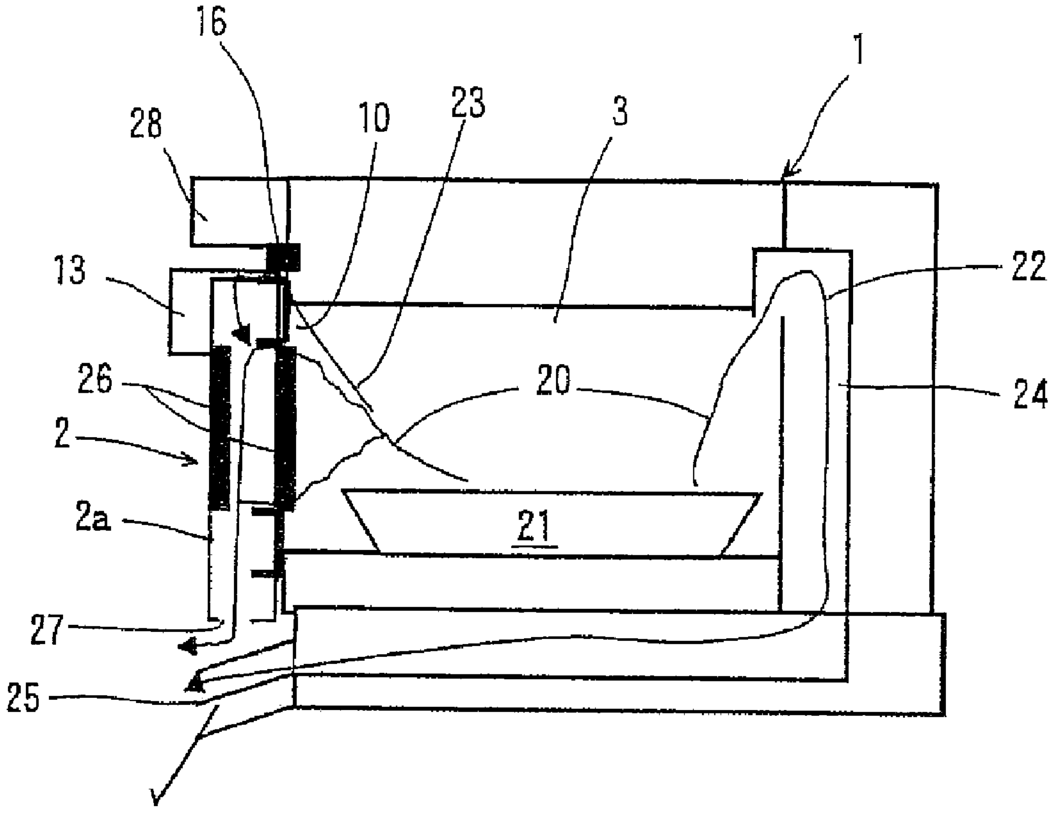
FIG. 5 is a diagram showing an outline of a flow of air flow including steam in the heating chamber in this drawer type cooking device.

As shown in FIG. 5, air flows which flow with including steam generated from an object to be heated in the heating chamber and are evacuated through the cooking device body 1 or door 2*a* are shown by flow lines 20. A part 22 of the air flows including steam generated from the object to be heated 21 is evacuated from a louver 25 through an exhaust duct 24 which is formed so as to communicate with a lower part of a bottom wall of the heating chamber from a back of a back wall of the heating chamber and to extend a lower part of the door 2*a* of the cooking device body 1. In addition, the other part 23 of the air flows including steam generated flows upper forward toward the door 2*a*, flows into the door 2*a* from the environment of an door glass 26, and is evacuated to the open air from an exhaust vent 27 formed in a lower portion of the door 2*a* through an interior of the door 2*a*.

In the close state of the door 2*a*, the packing 16 installed in the edge 11 of the opening 10 prevents that an air flow including steam generated on the occasion of cooking of an object to be heated flows out outside through between the edge 11 of the opening 10, and the handles 13 provided in an upper edge of the door 2*a*. Hence, dewing is never generated on the handle 13 provided in the upper edge of the door 2*a*. In addition, when an operator panel 28 is above the handle 13, steam is hard to diverge outside and dews are easily attached on the handle 13 in a state of closing the door 2*a*, but it is easy to make a lower portion of the door 2*a* open to the air (an air supply and exhaust louver in the figure), and dews also are not easily attached in that case.

It is also possible to use a plurality of punching holes, dispersedly formed in a transverse direction of the door 2*a*, as the exhaust vent 27. When providing the plurality of punching holes with a small diameter, which has a high aperture rate, in the lower portion of the door 2*a*, it is possible to concentrate flows of steam on the exhaust vent 27, which prevents remarkable dewing in the vicinity also to dissolve a fog of the door glass 26. In addition, it is possible to prevent invasion of a foreign material or a noxious insect. The lower portion of the door 2*a* is not conspicuous, and does not contact at the time of load and unload of the object to be heated 21 into and from the heating container.

What is claimed is:

1. A drawer type cooking device which enables a drawer body, on which an object to be heated can be placed, to be drawn out with an door from a cooking device body, and enables an opening of a heating chamber to be closed with the door in a state of accommodating the drawer body in the heating chamber in the cooking device body, the drawer body slidably mounted for movement into and out of the cooking device body and having the door fixedly attached to the slidable drawer body;

a cooking device body panel fixedly fixed to the cooking device body and extending over the door of the slidable drawer body;

a handle for open and close operations provided in an upper portion of the door;

the cooking device body panel having a lower portion facing an edge of the opening;

wherein a packing with a sealing part is arranged in the edge of the opening of the cooking device body in a manner blocking a gap between, with the handle in a closed state of the door, and said packing is fixed to the cooking device body above the opening by means of side portions sandwiching the edge;

wherein an exhaust vent which leads to the opening on a ceiling of the heating chamber by way of an exhaust duct outside of and around the heating chamber is formed at a lower portion of the door; and wherein the handle comprises a handle body installed in an upper portion of a body of the door, and a finger-engaging part which extends in a front side of the door from the handle body concerned, and over which finger hooking is possible for open and close operations and the sealing part insulating the handle.

2. The drawer type cooking device according to claim 1, wherein the packing comprises a fixing part installed in a deep end edge of the opening, and the sealing part extending downward from the fixing part and being contactable with the handle.

3. The drawer type cooking device according to claim 2, wherein the sealing part is elastically contacted with an upper edge back part with being deformed by the upper edge back part of the pushed-in handle in a closed state of the door.

4. The drawer type cooking device according to claim 1, wherein the exhaust vent comprises a plurality of punching holes formed dispersedly.

5. The drawer type cooking device according to claim 1, wherein the packing comprises a fixing part installed in a deep end edge of the opening, and the sealing part extending downward from the fixing part and being contactable with the handle.

6. The drawer type cooking device according to claim 1, wherein the exhaust vent comprises a plurality of punching holes formed dispersedly.

7. A drawer type cooking device which enables a drawer body, on which an object to be heated can be placed, to be drawn out with an door from a cooking device body, and enables an opening of a heating chamber to be closed with the door in a state of accommodating the drawer body in the heating chamber in the cooking device body, the drawer body slidably mounted with respect to the cooking device body and having the door mounted to the slidable drawer body under a cooking device body panel of the cooking device body, a handle for open and close operations is provided in an upper portion of the door;

wherein a packing with a sealing part is fixed to an edge of the opening of the cooking device body in a manner blocking a gap between the handle and the cooking device body, with the handle in a closed state of the door, and said packing is fixed to the cooking device body above the opening by parallel side portions;

wherein an exhaust vent is formed at a lower portion of the door so that heated air from the heating chamber enters an upper portion of the door near the packing and is evacuated from the exhaust vent at the lower portion of the door without permitting steam to flow between the opening edge and the handle;

wherein an exhaust duct around the heating chamber is formed at an opening at a ceiling of the heating chamber so that heated air from the heating chamber enters the exhaust duct and passes on sides of and outside of the heating chamber and is evacuated from the cooking device body under a lower part of the door; and wherein the handle comprises a handle body installed in an upper portion of the door, and a finger-engaging part which extends in a front side of the door from the handle body concerned, and over which finger hooking is possible for open and close operations and the sealing part insulating the handle.

8. The drawer type cooking device according to claim 7, wherein the packing comprises a fixing part installed in a deep end edge of the opening, and the sealing part extending downward from the fixing part and being contactable with the handle.

9. The drawer type cooking device according to claim 8, wherein the sealing part is elastically contacted with an upper edge back part with being deformed by the upper edge back part of the pushed-in handle in a closed state of the door.

10. The drawer type cooking device according to claim 7, wherein the exhaust vent comprises a plurality of punching holes formed dispersedly.

11. The drawer type cooking device according to claim 7, wherein the packing comprises a fixing part installed in a deep end edge of the opening, and the sealing part extending downward from the fixing part and being contactable with the handle.

12. The drawer type cooking device according to claim 7, wherein the exhaust vent comprises a plurality of punching holes formed dispersedly.

* * * * *